(12) United States Patent
Mahkonen

(10) Patent No.: US 8,588,071 B2
(45) Date of Patent: Nov. 19, 2013

(54) DEVICE AND METHOD FOR ADAPTATION OF TARGET RATE OF VIDEO SIGNALS

(75) Inventor: Arto Juhani Mahkonen, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 485 days.

(21) Appl. No.: 12/921,428

(22) PCT Filed: Mar. 12, 2008

(86) PCT No.: PCT/SE2008/050275
§ 371 (c)(1),
(2), (4) Date: Sep. 8, 2010

(87) PCT Pub. No.: WO2009/113924
PCT Pub. Date: Sep. 17, 2009

(65) Prior Publication Data
US 2011/0013514 A1   Jan. 20, 2011

(51) Int. Cl.
*H04J 1/16* (2006.01)
(52) U.S. Cl.
USPC .......................... 370/235; 370/229; 370/230
(58) Field of Classification Search
USPC ............. 370/230, 229, 230.1, 232, 233, 234, 370/235, 252, 310, 312, 259, 338, 473, 474, 370/466, 493; 709/224, 220, 233, 232
See application file for complete search history.

(56) References Cited

U.S. PATENT DOCUMENTS

| | | | | |
|---|---|---|---|---|
| 6,894,974 B1 * | 5/2005 | Aweva et al. | ............. | 370/230.1 |
| 7,496,040 B2 | 2/2009 | Seo | | |
| 2002/0002708 A1 | 1/2002 | Arye | | |
| 2002/0181494 A1 | 12/2002 | Rhee | | |
| 2002/0194361 A1 * | 12/2002 | Itoh et al. | ..................... | 709/233 |
| 2003/0037158 A1 * | 2/2003 | Yano et al. | ..................... | 709/232 |
| 2003/0126238 A1 * | 7/2003 | Kohno et al. | ................. | 709/220 |
| 2003/0152032 A1 * | 8/2003 | Yanagihara et al. | ........ | 370/236.1 |
| 2003/0165150 A1 | 9/2003 | Zimmermann et al. | | |

(Continued)

FOREIGN PATENT DOCUMENTS

| | | |
|---|---|---|
| CN | 1725760 A | 1/2006 |
| CN | 1980237 A | 6/2007 |

(Continued)

OTHER PUBLICATIONS

Jammeh, E., et al. "Delay-based Congestion Avoidance for Video Communication With Fuzzy Logic Control", Packet Video 2007, IEEE, PI, XP031170593, Nov. 1, 2007, pp. 8-17.

(Continued)

*Primary Examiner* — Abdullah Riyami
(74) *Attorney, Agent, or Firm* — Coats & Bennett, P.L.L.C.

(57) ABSTRACT

A device, system, and method for adapting a current target rate of a video signal (VS) transmitted from a video provider (32) to a video receiver (10). The method includes receiving the video signal (VS) at the video receiver (10), measuring at the video receiver (10) at least an indicator of the received video signal (VS), the at least an indicator being different from a packet loss rate, calculating at the video receiver (10) a new target rate based on the current target rate of the received video signal (VS), the at least an indicator, and at least a reference, and transmitting from the video receiver (10) the new target rate to the video provider (32) to adapt the current target rate.

17 Claims, 16 Drawing Sheets

(56) References Cited

U.S. PATENT DOCUMENTS

| | | | |
|---|---|---|---|
| 2006/0251167 | A1 | 11/2006 | Van Der Schaar et al. |
| 2006/0280205 | A1* | 12/2006 | Cho .............................. 370/473 |
| 2007/0153827 | A1* | 7/2007 | Lee .............................. 370/466 |
| 2007/0165524 | A1* | 7/2007 | Mascolo ....................... 370/230 |
| 2008/0192710 | A1* | 8/2008 | Balachandran et al. ...... 370/338 |
| 2010/0098176 | A1* | 4/2010 | Liu ............................... 375/259 |

FOREIGN PATENT DOCUMENTS

| | | |
|---|---|---|
| EP | 1619816 A2 | 1/2006 |
| WO | 9722201 A2 | 6/1997 |
| WO | 00/67469 | 11/2000 |
| WO | 02/17644 A1 | 2/2002 |
| WO | 03/098935 A2 | 11/2003 |

OTHER PUBLICATIONS

Mahkonen, A., et al. "A Comparison of Request and Measurement Based End to End Video Target Rate Adaptation Methods", MobiMedia'06, XP55018324,Oulu, Finland, Jul. 7, 2008.

Cheng, J., et al., "FAST TCP: Motivation, Architecture, Algorithms, Performance", Proceedings of IEEE Infocom, Hong Kong, Mar. 1, 2004, pp. 1-12, XP008128094.

Chinese Office Action issued Jun. 19, 2012 in re CN Patent Application No. 200880127953.7.

Karademir, S. et al. "Dynamic Rate Control of VBR MPEG Video Transmission over ATM Networks." Global Telecommunications Conference, vol. 3, Nov. 18-22, 1996, pp. 1509-1515.

Radha, H. et al. "Encoder Buffer Constraints for Video Transmission over Networks with no Quality-of-Service Guarantees." Proceedings of the 6th IEEE Symposium on Computers and Communications, Jul. 3-5, 2001, pp. 359-363.

* cited by examiner

DEVICE AND METHOD FOR ADAPTATION OF TARGET RATE OF VIDEO SIGNALS

TECHNICAL FIELD

The present invention generally relates to video enabled systems, devices, software and methods and, more particularly, to mechanisms and techniques for adapting a target rate of a video signal.

BACKGROUND

With the development of the Internet and related technologies and due to the continuous increase of the bandwidth capabilities of the communication networks, the transmission of video information over the Internet becomes more popular and more reliable. In the past, the quality of the transmitted video signals over the Internet has been low for the following reasons. In conversational video telephony services, the video encoder usually applies a predetermined rate control function, which tries to maintain an average source bit-rate constant as close as possible to a given target bit-rate.

In packet switched networks, like Video Telephony over IP (VToIP), a transport delay of video packets will vary due to several reasons. One of the reasons is the varying load on the transport links, which may cause a low frequency fluctuation of transport delay and even bursty congestion peaks, as shown for example in FIG. 1. FIG. 1 shows an example of a congestion peak between 40 and 50 s. The video transport delay is occurring as shown in FIG. 1, when the transmitter/receiver has no target rate adaptation and the buffer size is infinite. The infinite buffer size means that packets are never lost due to buffer overflow. The congestion peak may happen because of a sudden increase in Internet traffic and may last up to several seconds. In FIG. 1 the congestion lasts from 10 s to 50 s. The congestion peaks conventionally may cause a slow down of the transmission of video data, which results at a receiver side, in a degradation of a quality of a perceived image, like for example, a delay variation, packet losses, or a freezing and jumping of a displayed image. Thus, in the past it was unlikely, using the Internet and not a dedicated transmission network, to receive a good quality video signal that lasts over a certain time, for example, the couple of minutes which might be necessary for having a videoconference or a video phone conversation.

The integrity of the decoded video is usually damaged due to losses, as it is known that video compression is based on motion compensation, which uses previous decoded frames as references for the future frames. How long these disturbances last will depend on the Intra-refresh (IR) process (i.e., encoding a frame or parts of the frame without motion compensation) which is used. The IR process is needed because a transmission of video data over a wireless network can be unreliable due to channel loss. Errors resulting from channel loss can adversely impact the quality of video presented to a user. In particular, channel errors can reduce not only the quality of a current frame, but also subsequent Inter-coded frames generated from the current frame using motion estimation and compensation techniques. To limit propagation of channel-induced errors from one frame to another, a video encoder typically applies an IR process. The IR processes are described, for example, by the Moving Picture Experts Group (MPEG) or the International Telecommunication Union (ITU).

To address these problems, there were proposed several state of the art techniques. Some of the existing techniques rely on admission control methods, which typically block new sessions when a loaded communication network (or a loaded link between nodes) is detected. Some of the techniques use video target rate adaptation, which is based on a feedback from a video receiver to a sender.

However, one problem associated with the existing video target rate adaptation methods is that they are usually based on some average aggregate maximum capacity, which may be insensitive to temporary (short time) congestions caused by statistical multiplexing of variable rate streams. The temporary congestions are relevant and should be addressed if best effort traffic is competing for the same resources. There are also more advanced measurement based dynamic admission control methods, but these methods are usually based on link-by-link level rather than end-to-end level. The link-by-link level refers, for example, to a system of multiple base stations and mobile phones. Two mobile phones are connected to each other via a plurality of links, each link connecting either a base station to the mobile phone or the base station to another base station or to another network node (like a radio network controller, gateway or router). The number of links between the two mobile phones depends on the geographic distance between the phones and whether the mobile phones are located in the same radio access network or not. Thus, in this particular example, more than two links may exist between the two mobile phones and the control methods measure various parameters for each link. Unlike the link-by-link level, the end-to-end level monitors the signals received at the two mobile phones and not at the links between various network nodes.

Feedback based target rate adaptation methods generally use end-to-end level monitoring. However, the existing methods are based on a relaxed feedback mechanism, which usually cannot cope with the bursty congestion peaks. Another problem of the existing methods is the poor recovery of the target rate back to its original level, after the congestion period is over. For example, a traditional method adapts a target rate based on packet loss measurements. A first problem of this method is that it takes a long time to receive reliable measurements of the packet loss rate (PLR) at the transmitter from the receiver. When the PLR is considered to be high, the target rate on the encoder is reduced, but this process happens too late, and the congestion peak may even be over already. Still another problem associated with this method is that when the PLR=0, it is difficult to know how much to increase the target rate without causing packet losses and deteriorating the quality of the transmitted video, because the combination of (i) a measured PLR that is 0 and (ii) a reduced target rate does not necessarily imply that the congestion is over. To avoid this problem, the target rate in the existing methods recovers very slowly or it may even stay down permanently, which results in the video encoder using a low target rate and consequently, unnecessarily degrades the perceived quality of the transmitted video even after a temporary congestion peak.

Thus, it is an objective of the following exemplary embodiments to address and solve one or more of the above discussed problems of the existing methods and techniques.

SUMMARY

According to an exemplary embodiment, there is a method for adapting a current target rate of a video signal transmitted from a video provider to a video receiver. The method includes receiving the video signal at the video receiver; measuring at the video receiver at least an indicator of the received video signal, the at least an indicator being different from a packet loss rate; calculating at the video receiver a new target rate based on the current target rate of the received video signal, the at least an indicator, and at least a reference; and transmitting from the video receiver the new target rate to the video provider to adapt the current target rate.

According to another exemplary embodiment, there is a method for adapting a current target rate of a video signal transmitted from a video provider to a video receiver. The method includes transmitting the video signal at the current target rate from the video provider; receiving at the video provider at least an indicator of the video signal received by the video receiver, the at least an indicator being different from a packet loss rate; calculating at the video provider a new target rate based on the current target rate of the transmitted video signal, the at least an indicator, and at least a reference; and adapting at the video provider the current target rate to the new target rate.

According to still another exemplary embodiment, there is a device for calculating a new target rate of a video signal transmitted from a video provider. The device includes at least an input/output port configured to receive the video signal; a processor connected to the at least an input/output port and configured to determine at least an indicator from the received video signal, the at least an indicator being different from a packet loss rate, calculate a new target rate based on the current target rate of the received video signal, the at least an indicator, and at least a reference; and the input/output port is further configured to transmit the new target rate to the video provider such that the video provider adapts the current rate to the new target rate.

According to another exemplary embodiment, there is a video provider for adapting a current target rate of a video signal transmitted to a video receiver. The video provider includes an input/output configured to transmit the video signal at the current target rate and to receive at least an indicator measured by the video receiver based on the received video signal, the at least an indicator being different from a packet loss rate; and a processor configured to calculate a new target rate based on the current target rate of the transmitted video signal, the at least an indicator, and at least a reference, and to adapt the current target rate to the new target rate.

According to one exemplary embodiment, there is a device for calculating a new target rate of a video signal transmitted from a video provider. The device includes means for receiving the video signal; means for measuring at the device at least an indicator from the received video signal, the at least an indicator being different from a packet loss rate; means for calculating at the device a new target rate based on the current target rate of the received video signal, the at least an indicator, and at least a reference; and the means for receiving is further configured to transmit the new target rate to the video provider such that the video provider adapts the current rate to the new target rate.

According to another exemplary embodiment, there is a system for adapting a current target rate of a video signal. The system includes a video provider configured to transmit the video signal at the current target rate; a video receiver configured to receive the video signal, measure at least an indicator from the received video signal, the at least an indicator being different from a packet loss rate, calculate a new target rate based on the current target rate of the received video signal, the at least an indicator, and at least a reference, and transmit the new target rate to the video provider; and a base station configured to connect the video receiver to the video provider. The video provider adapts the current rate to the new target rate.

According to another exemplary embodiment, there is a computer readable medium including computer executable instructions, where the instructions, when executed by a processor, cause a video receiver including the processor to calculate a new target rate of the video signal. The instructions include receiving the video signal at the video receiver; measuring at the video receiver at least an indicator of the received video signal, the at least an indicator being different from a packet loss rate; calculating at the video receiver a new target rate based on the current target rate of the received video signal, the at least an indicator, and at least a reference; and transmitting from the video receiver the new target rate to the video provider to adapt the current target rate.

LIST OF ABBREVIATIONS

VtoIP—Video Telephony over IP;
IR—Intra-refresh;
MPEG—Moving Picture Experts Group;
ITU—International Telecommunication Union;
PLR—Packet Loss Rate;
PSNR—Peak Signal to Noise Ratio;
CDF—Cumulative Distribution Functions;
CCDF—Complementary Cumulative Distribution Functions;
LAN—Local Area Network;
VS—Video Signal;
RTCP—Real-time Control Protocol;
SDP—Session Description Protocol;
SR—Sender Report;
RR—Receive Report;
RTP—Real-time Transport Protocol;
MBR—Maximum Bit Rate;
GBR—Guaranteed Bit Rate;
DVD—Digital Versatile Disc;
ASIC—Application Specific Integrated Circuit;
DSP—Digital Signal Processor;
FPGA—Field Programmable Gate Array;
IC—Integrated Circuit;
FM—Frequency Modulated;
LCD—Liquid Crystal Display;
OLED—Organic Light-Emitting Diode;
WLAN—Wireless Local Area Network.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 15 is a schematic diagram of a process of adjusting a current target rate of a video signal according to the exemplary embodiment shown in FIG. 14a.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a Video Telephone. However, the embodiments to be discussed next are not limited to a Video Telephone but may be applied to other devices capable of receiving video signals.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 2:
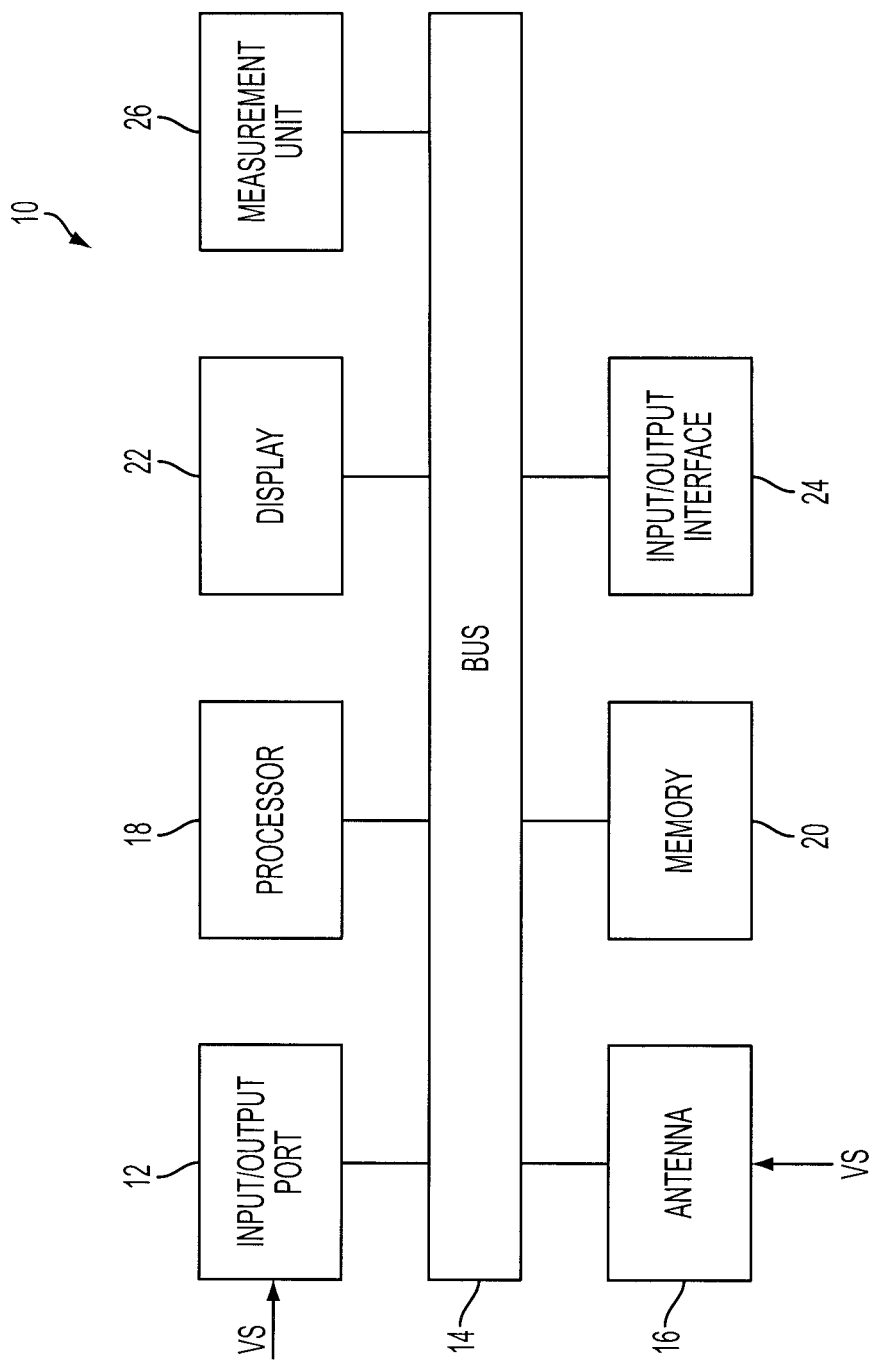
FIG. 2 is a schematic diagram of a video enabled device according to an exemplary embodiment.

In order to provide some context for this discussion, an exemplary video enabled device 10 is shown in FIG. 2. The device 10 may be a video provider, a video receiver or a combination of the two. The device 10 includes an input/output port 12 that is configured to receive a video signal VS. The input/output port 12 may be connected via a bus 14 to an antenna 16 or to a wireline (not shown) to receive the video signal VS. The video signal VS may be transmitted along the wireline to the device 10 or wireless. The antenna 16 may be a single antenna or a multiple antenna and may be configured to receive the video signal VS via an infrared, radio frequency or other known wireless interfaces. The input/output port 12 is also connected to a processor 18 that receives the video signal VS for processing. The processor 18 may be connected via the bus 14 to a memory 20. The memory 20 may store the video signal VS and other data necessary for the processor 18, for example a data rate target of the video provider. In an exemplary embodiment, the device 10 may have a display 22 configured to display an image corresponding to the received video signal VS. The device 10 may have in another exemplary embodiment an input/output interface 24, e.g., a keyboard, a mouse, a microphone, a video camera, etc., which is capable of inputting commands from a user. The device 10 may have in another exemplary embodiment a measurement unit 26, connected to the bus 14, which is capable of measuring various indicators of the received video signal VS.

Examples of the various indicators include, but are not limited to, a transport delay, buffering delay or level, received bit-rate or packet rate, packet loss rate, etc. Examples of definitions of the various indicators are as follow. The transport delay is defined as a time measured from the transmission of a packet from the sending device until the reception of the packet at the receiver. The buffering delay is a time a packet spends in a memory buffer since its reception until its consumption (like rendering on the display in video case). The buffering level indicates the number of pending packets in a memory buffer on the receiver's side. The received bit-rate is measured by dividing the sum of received packet sizes in bits during a certain time period by the duration of that time period. The received packet rate is measured by dividing the number of received packets during a certain time period by the duration time period. The packet loss rate is the number of lost packets during a certain time period divided by the duration of the time period (usually given in percentage). A lost packet is a packet that has been transmitted but did not arrive at the receiver (or is not consumed by the receiver). The detection of a packet loss is usually based on a sequence numbering inserted to the packet on the sender's side. Examples of the video enabled device 10 are a computer, a fixed phone, a mobile phone, a copier, a fax machine, a personal digital assistant, a video camera, a still camera, etc.

Figure 3:
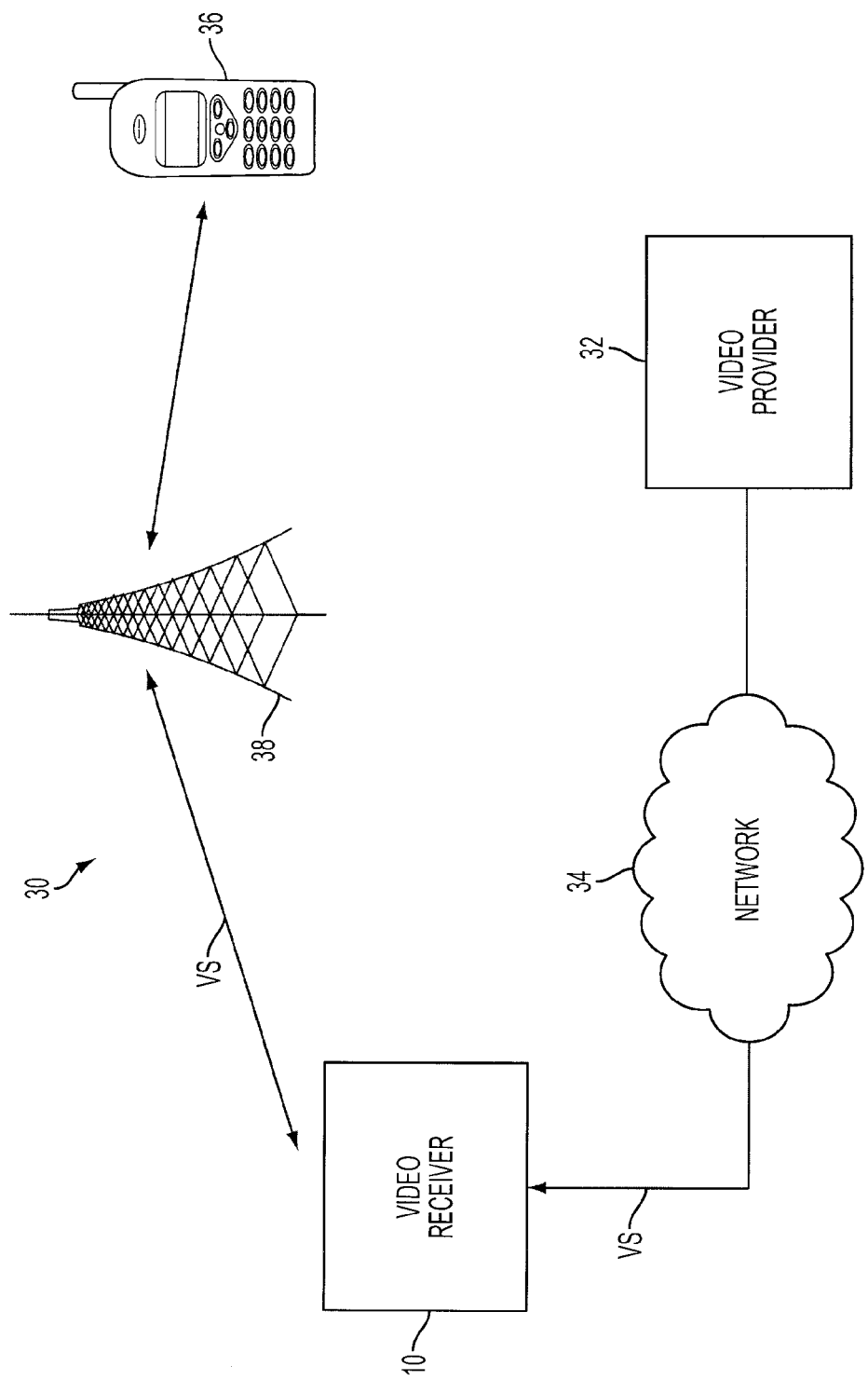
FIG. 3 is a schematic diagram of a video system according to an exemplary embodiment.

In another exemplary embodiment shown in FIG. 3, a system 30 includes the device 10 and at least one of a wired video provider 32 and a wireless video provider 36. The wired video provider 32 is connected to the device 10 via a network 34, which may be a traditional telephone network, a LAN network, the Internet, or any cable based network. The wireless video provider 36 transmits the video signal VS over a wireless network, which includes at least one of a base station 38 in a communication system, a wireless router/modem in a home network, and other known wireless providers, to the device 10, which may be, for example, a mobile phone.

Figure 4:
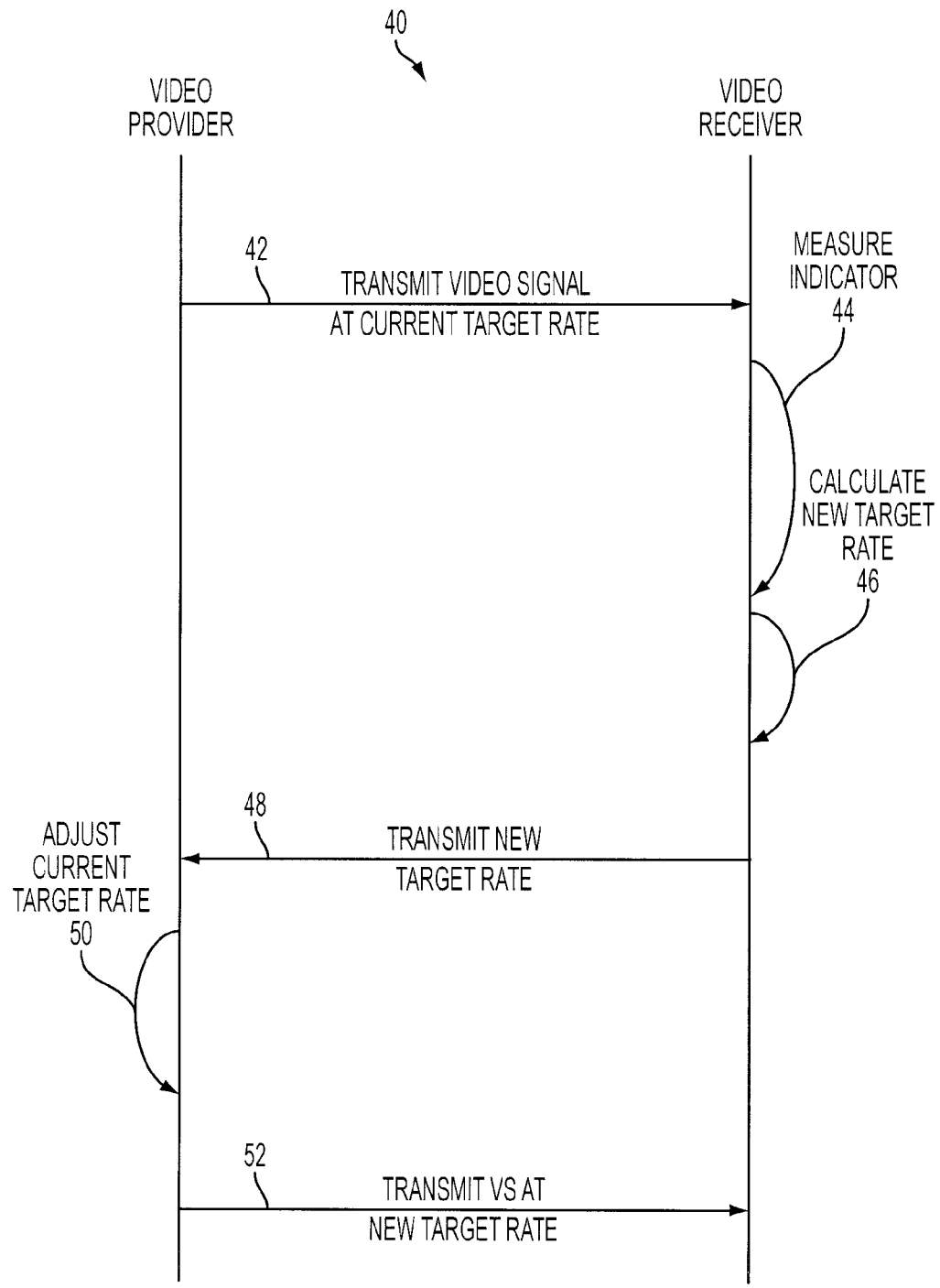
FIG. 4 is a schematic diagram of a process of adjusting a current target rate of a video signal according to an exemplary embodiment.

Turning now to a process 40 describing the transmission and control of video data from a video provider (e.g., video provider 32) to a video receiver (e.g., device 10), FIG. 4 shows that in step 42, the video provider has a predetermined transmitting target rate, i.e., a current target rate. In one exemplary embodiment, the current target rate is 120,000 bit/s. For the simplicity of the discussion, element 32 is called a video provider and element 10 is called a video receiver. However, it is noted that both elements 10 and 32 may transmit and receive video signals and may act as receivers/transmitters. The process 40 describes the transmission and control of the video data at a high level. Details related to the process 40 are discussed later. The video signal VS is transmitted to the video receiver at the current target rate. The video receiver, according to an exemplary embodiment, measures in step 44 one or more indicators of the received video signal VS. The video target rate is then controlled based on the measured indicators as discussed next.

According to an exemplary embodiment, the video target rate (e.g., bit rate) is controlled by an interactive feedback based on more sensitive indicators (m) than the conventional PLR, so that the feedback may react faster to the bursty congestions that may appear in the transmission network. For example, if the video signal transmits 25 frames per second, the PLR is conventionally measured twice a second while the indicators "m" are measured for each received packet. In another exemplary embodiment, the indicators are measured by the video receiver 10 for each frame. A frame may be fragmented to n packets (e.g. a packet per slice or group of block, GOB, depending on the used video standard), where n is an integer between 2 and tens, depending on the quality class (i.e., bandwidth) of the source video. In one exemplary embodiment, there may be one or more of such indicators $m_j$ (j=1 to the number of indicators). The indicator(s) may be based on different measurements, like transport delay, buffering delay or level, received bit-rate or packet rate, PLR, etc.

The determined values of the indicator(s) are compared to corresponding fixed or adaptive references $r_k$ (k=1 to the number of references). According to an exemplary embodiment, a reference is at least one of a low pass filtered delay, an asymmetrically weighted low pass filtered delay, and delay thresholds based on addition of low pass filtered delay scaled estimates of the power of the high pass filtered delay. A new target rate ($tr_{new}$) is determined, based on a recursive state function q(m, r, $tr_{old}$) that acts on the indicators "m," on references "r," and on the previous target rate $tr_{old}$. The new target rate is illustrated by the following equation:

$$tr_{new} = q(\bar{r}, \bar{m}, tr_{old}), \quad (1)$$

where $tr_{old}$ is the old target rate, $\bar{r}$ is a vector representing the references ($r_k$), and $\bar{m}$ is a vector representing the indicators ($m_j$). The function q(.) is defined so that the new target rate is changing in the right direction and with proper steps depending on the values of the indicators $m_j$ and references $r_k$, as will be discussed later. In one exemplary embodiment, the function "q" for downwards target rate adaptation is given by:

$$q(\bar{r}, \bar{m}, tr_{old}) = [(\text{highThreshold}_i - \text{fixDel}_i)/(\text{med}_i - \text{fixDel}_i)] * tr_{old}$$
$$\bar{r} = \{\text{fixDel}_i, \text{highThreshold}_i\}$$
$$\bar{m} = \{\text{med}_i\}, \quad (2)$$

where the quantities defining the function "q" are explained later.

The new target rate is calculated in step 46, according to an exemplary embodiment, at the video receiver. Alternatively, the new target rate may be calculated at the video provider subject that the video receiver transmits the measured indicators to the video provider. The calculated new target rate is feedback in step 48 to the video provider so that the video provider can adjust its video bit rate according to the traffic and other conditions present in the network. An example of another condition is the fading in a radio access, which depends on the motion of the mobile client (in addition to the crossing traffic). If the traffic in the network is low, the bit rate may be adjusted upward by the video provider and if the traffic in the network is high, the bit rate may be adjusted downward as will be discussed later. The feedback is understood in one exemplary embodiment to mean signaling the new target rate from the video receiver to the video provider.

Depending on what information is transmitted in the feedback loop, the target rate adaptation may be measurement based or request based. If the video receiver sends the measured indicators to the video provider, which then calculates the new target rate, the process is called measurement based adaptation. Alternatively, if the receiver knows the target rate used by the sender, then the receiver calculates the new target rate and sends it to the sender as a request. This is called a request based adaptation. The second approach is more efficient in terms of overhead signaling than the first approach. The exemplary embodiments of this application are applicable to both processes. However, for the simplicity of the discussion, the terminology of the request based process is used and examples related to the request based process are presented next.

A disadvantage of the measurement based target rate adaptation is the need of a common agreement among vendors (producers of the video provider, video receiver and associated processes) about what parameters to measure and how to calculate the target rate. The request based target rate adaptation is more flexible because this method does not require agreements between vendors and does not require extended transmission capacity. Also, the request based target rate allows the receiver to use more indicators and adaptive references for the adaptation than the measurement based adaptation. In this regard, the measurement based adaptation of the target rate is limited in terms of the number of indicators and references because a large number of indicators and references results in large overhead transmission, which is difficult due to the limited bandwidth availability.

When the video provider receives in step 48 the new target rate calculated by the video receiver, the video provider adjusts in step 50 its current target rate and continues to transmit video signals at the new target rate in step 52. One advantage of the process discussed above in comparison to traditional processes that use PLR for determining the new target rate, is that the indicators used by process 40 are time sensitive to a bursty congestion peak unlike the PLR, as discussed above.

However, if the actual target rate changes and the rate change process trigger a determination of the new target rate too frequently, the transmission of the video signal may be negatively affected because of the amount of measurements and calculations taking place in the video receiver. To prevent frequent target rate changes and oscillations, certain triggering conditions may be used in an exemplary embodiment, i.e., a change in the target rate is performed only if certain indicators fall below a predetermined threshold condition. Different triggering conditions may be used for increasing or decreasing the target rate. In other words, for increasing the target rate, a condition ($\text{cond}_{up}$) for changing upwards the current target rate that is different from a condition ($\text{cond}_{down}$) for changing downwards the current target rate. The conditions may be, in one exemplary embodiment, based on Boolean functions of the measured indicators and stored references. Optionally, the conditions may include some timing conditions, for example, not more often than once in regular real-time control protocol (RTCP) period or not before the previous request or measurement has been responded to by a notification, etc. Thus, in this exemplary embodiment, a new target rate is calculated if either one of these conditions is true.

According to another exemplary embodiment, the target rate may be bound within a certain range. Thus, the target rate is not allowed to increase above a certain maximum value $tr_{max}$ or decrease below a lower limit $tr_{min}$. Another alternative is to suspend the video component, if the target rate is requested to go below $tr_{min}$. The range may be agreed upon by control signaling (like INVITE and REINVITE of SIP/SDP signaling, see for example IETF RFC 4566 (2006): "SDP: Session Description Protocol", the entire content of which is incorporated by reference herein).

In the following exemplary embodiments, the process that adjusts the current rate is described in more detail. For exemplary purposes, a complete listing of instructions to be executed by a processor to calculate the new target rate to adjust the current rate is presented below. Various computer language environments may be used to provide the instructions for the processor. In another embodiment, electrical circuitry may be programmed to execute the instructions. The instructions discussed next are applicable to each received video frame "i."

According to an exemplary embodiment, the video target rate adaptation is achieved based on using an estimate of a transport delay $d_i$, where "i" is the frame index and $d_i$ is the indicator. In a network based on packet switching, the transport delay is the amount of time required to push all of the packet's bits into the wire. In other words, this is the delay caused by the data-rate of the link. The transport delay may be a function of the packet's length and has nothing to do with the distance between the two nodes. This delay is proportional to the packet's length in bits. The delay is also produced by the queuing delay in the buffers of the network nodes through which the packet travels. This is a cause for the transport delay variation caused by the crossing traffic and also one reason for congestion. This can be improved by requesting the (competing) senders to lower their sending bit rate and consequently to make the packet sizes smaller. Optionally, the video target rate adaptation may use a packet loss $plr_i$ as the indicator, in addition to the $d_i$ indicator. The packet loss indicator $plr_i$ is determined over the time interval between two consecutive RTCP Sender or Receiver Reports (SR/RR) messages (according to IETF's RFC 3550).

Various delay indicators are determined by the equations:

$$med_i = \underset{j=0}{\overset{M-1}{\text{median}}}\{d'_{i-j}\} \quad (3)$$

$$max_i = \underset{j=0}{\overset{M-1}{\max}}\{d'_{i-j}\}$$

$$d'_{i-j} = \left(\sum_{k=0}^{N_{i-j}} d_{i-j-k}\right)/N_{i-j}$$

where M is the number of most recently received complete frames over which the indicators are determined, and $N_{i-j}$ is the number of packets belonging to the frame i-j, and "median" and "max" are the mathematical functions corresponding to calculating a median and a maximum, respectively, of a collection of values corresponding to the transport delay $d'_i$ of frame, which is estimated as an average over the transport delays $d_i$ of individual packets per frame (if there are many). In one exemplary embodiment M may be 3.

A single transport delay $d_i$ of a packet, measured in ms, is determined by the following equation:

$$d_i = t_{arr,i} - TS_i/90 + clk_{skew} \quad (4)$$

where $t_{arr,i}$ is the arrival time of the packet i, $TS_i$ is the Real-Time Transport Protocol (RTP) time stamp value of packet "i" in periods of 90 kHz clock, and $clk_{skew}$ is an unknown value representing the clock skewing between the source and destination. The RTP defines a standardized packet format for delivering audio and video over the Internet, which was developed by the Audio-Video Transport Working Group of the Internet Engineering Task Force, see RFC 3550. The functions which depend on $d_i$ in the instructions listed below, are insensitive to the clock skewing, removing the need to demand an accurate synchronization between the time of the sender and the time of the receiver. In one exemplary embodiment, relaxed and steady drifting time differences between the video provider and video receiver may be tolerated.

A $minMax_i$ variable is defined as the smallest maximum and $maxMax_i$ the biggest maximum over all sliding windows defined in the equation set (2) since the previous rate adaptation, and these variables are given by equations:

$$minMax_i = \underset{j=0}{\overset{I_i-1}{\min}}\{max_{i-j}\} \quad (5)$$

$$maxMax_i = \underset{j=0}{\overset{I_i-1}{\max}}\{max_{i-j}\}$$

where $max_{i-j}$ is defined in the equation set (3) and $I_i$ is the number of frames since the previous rate adaptation.

In one exemplary embodiment, to determine an estimate of a current minimum level of the transport delay (or a so called fixed delay, $fixDel_i$), the signal $med_i$, defined in the equation set (2), is filtered by an asymmetrically weighted low pass filter defined in the equation set (6):

$fixDel_i = (1-a_{up}) \cdot fixDel_i + a_{up} \cdot med_i$ if $med_i \geq fixDel_i$ $fixDel_i = (1-a_{down}) \cdot fixDel_i + a_{down} \cdot med_i$ if $med_i < fixDel_i$ $a_{down} = a_{up}/AWLP\_RATIO$ $a_{up} = 1/(i+1)$ if $0 \leq i < FIXDEL\_MAX\_N$ $a_{up} = 1/FIXDEL\_MAX\_N$ if $i \geq FIXDEL\_MAX\_N$ where FIXDEL_MAX_N is a given inline constant (FIXDEL_MAX_N=2000 in one exemplary embodiment).

To obtain an estimate of a short term inter arrival jitter level, the absolute value of the high pass filtered frame delays $d'_i$, defined in the equation set (3), are calculated by the equation (7) as follows:

$$h_i = |1 \cdot d'_i - 2 \cdot d'_{i-1} + 1 \cdot d'_{i-2}| \quad (7)$$

The $clk_{skew}$ is canceled out when calculating $h_i$.

The high pass filtered signal $h_i$ is low pass filtered by the equation set (8):

$iarrJit_i = (1-b) \cdot iarrJit_i + b \cdot h_i$ $b = 1/(i+1)$ if $0 \leq i < IARRJIT\_MAX\_N$ $b = 1/IARRJIT\_MAX\_N$ if $i \geq IARRJIT\_MAX\_N$, $\quad (8)$ where IARRJIT_MAX_N is a given inline constant (IARRJIT_MAX_N=1000 in one exemplary embodiment).

Thresholds $lowThreshold_i$ and $highThreshold_i$ are defined by the equation set (9):

help=LOW_COEF*$iarrJit_i$ if(help<MIN_LOW_MARGIN)
   help=MIN_LOW_MARGIN $lowThreshold_i = fixDel_i + help$ help=HIGH_COEF*$iarrJit_i$ if(help<MIN_HIGH_MARGIN)
   help=MIN_HIGH_MARGIN if(help>MAX_HIGH_MARGIN)
   help=MAX_HIGH_MARGIN $highThreshold_i = fixDel_i + help$, $\quad (9)$ where $iarrJit_i$ is defined in the equation set (8) and $fixDel_i$ in the equation set (2). LOW_COEF, HIGH_COEF, MIN_LOW_MARGIN, MIN_HIGH_MARGIN and MAX_HIGH_MARGIN are inline parameters. In one exemplary embodiments, the following values were used: LOW_COEF=1.2, HIGH_COEF=3.5, MIN_LOW_MARGIN=5 ms, MIN_HIGH_MARGIN=20 ms and MAX_HIGH_MARGIN=200 ms.

The target rate adaptation process is enabled or disabled by certain Boolean variables $cond_{up}$ and $cond_{down}$, which may be used to embed the timing constraints, like when a new target rate request is first allowed after the previous one. According to an exemplary embodiment, the conditions according to the equation set (10) are used:

$$boolhelpFlag = (t_{now} \geq t_{regularRTCP})$$
$$\lor (earlySent = FALSE)$$

$$cond_{up} = cond_{down} = helpFlag \land rateNotified, \quad (10)$$

where $t_{now}$=current time, $t_{regularRTCP}$=next scheduled time to send a regular RTCP SR/RR (according to IETF's RFC 3550), earlySent=boolean variable that indicates whether the last transmitted RTCP message has been early (defined in IETF's RFC 4585), and rateNotified=boolean variable that indicates whether a notification for a target rate request has been received by the video receiver.

A complete target rate request triggering set of instructions, according to one exemplary embodiment, is presented in the following pseudo-code. However, other variants of the set of instructions may be used as would be understood by those skilled in the art. The set of instructions include:

```
if (cond_down)∧((med_i > highThreshold_i)∨(plr_i > 0))
{ // decrease the target rate
    p_down = (highThreshold_i - fixDel_i)/(med_i - fixDel_i)   //clk_skew is
    canceled
    // p_down > 1 is possible, if (plr_i > 0)∧(med_i < highThreshold_i)
    if (p_down > 1) p_down = 1
    p_down = (1 - PLOSS_WEIGHT · plr_i) · p_down
    plr_i = 0   // clear it for the next period
    help = (targetRateOld - GBR)/(MBR - GBR)
    limit = PDOWN_MAX - PDOWN_SLOPE · help
    if (p_down < limit) p_down = limit
    exactRate = p_down * exactRate
    targetRateNew = 128 * ⌊exactRate/128⌋
    if (targetRateNew < GBR)targetRateNew = GBR
    if (targetRateNew≠targetRateOld)
    {
        maxUpSlope = MIN_UP
        upSlopeStep = 0
    }
    minMax_i = 999999999   // reset to something big
    maxMax_i = -999999999   // reset to something small
}
else if (cond_up)∧(minMax_i < lowThreshold_i)∧(med_i < lowThreshold_i)
            ∧ (maxMax_i < highThreshold_i)∧(plr_i = 0)
{ // increase target rate
    p_up = maxUpSlope
    exactRate = p_up * exactRate
    targetRateNew = 128 * ⌊exactRate/128⌋
    if (exactRate ≥ MBR )
    {
        exactRate = MBR
        targetRate New = MBR
    }
    dt = t_now - t_prevRTCP
    upSlopeSte p = upSlopeSte p + dt · STEP_INC   // STEP_INC
    defined per s
    help = dt · MAX_STEP   // MAX_STEP defined per s
    if (upSlopeSte p > help ) upSlopeSte p = help
    maxUpSlope = maxUpSlope + upSlopeStep
    if (maxUpSlope > MAX_UP) maxUpSlope = MAX_UP
    minMax_i = 999999999   // reset to something big
    maxMax_i = 0   // reset
}
else
{ // comes here if target rate is not changed
    targetRateNew = targetRateOld
}
```

Some of the variables of the above instructions are defined in equations (1)-(8) while the rest of the variables are explained next. A static variable is considered in the following as a variable that remembers its current value till the next time. $t_{prevRTCP}$ is a previous scheduled time to send a regular RTCP SR/RR message (static variable); regularRTCPInterval is an interval between two consecutive regular RTCP SR/RR messages, i.e., a random value around some nominal average (500 ms in one exemplary embodiment,); targetRateOld is the last notified target and in one exemplary embodiment it is assumed that this target rate is currently used by the video sender; MBR is a maximum target bit rate (constant given value, 128000 bps in the exemplary embodiment); GBR is a guaranteed target bit rate (constant given value, 60000 bps in the exemplary embodiment); exactRate is the exact value of the current target bit rate, it is set equal to a notified target rate when received from the video sender (static variable); maxUpSlope is a current value for $p_{up}$ (static variable); upSlopeStep is a current value for an increment by which maxUpSlope is incremented, when the target rate is changed upwards (static variable); STEP_INC is a step by which upSlopeStep is incremented when the target rate is changed upwards (in the exemplary embodiment this variable is given per 1 s and requires scaling by the interval between regular RTCP SR/RR messages (inline parameter of 0.00001 in the exemplary embodiment); MAX_STEP is a maximum value for upSlope-Step, is given per 1 s and requires in the exemplary embodiment a scaling by the interval between regular RTCP SR/RR messages (inline parameter of 0.006 in the exemplary embodiment); MAX_UP is an upper limit of maxUpSlope (inline parameter of 1.1 in the exemplary embodiment); MIN_UP is a lower limit of maxUpSlope (inline parameter of 1.0001 in the exemplary embodiment); PLOSS_WEIGHT is a weighting factor of packet losses (inline parameter of 0.1 in the exemplary embodiment); PDOWN_MAX is an inline parameter (1.0 in the exemplary embodiment); and PDOWN_SLOPE is an inline parameter (0.5 in the exemplary embodiment).

In the exemplary embodiment discussed above, the downwards adaptation behaves differently than the upwards adaptation. The target rate is allowed to quickly move down at first (fast attack) and after that the maximum step size is reduced proportionally to the ratio of the difference between the current rate and GBR to the (preset constant) difference between MBR and GBR. Thus the target rate approaches asymptotically the GBR as long as the condition to decrease the target rate prevails. Also, early RTCP is allowed in one exemplary embodiment only for downwards adaptation. The rate recovers up with a slower speed and upwards adaptation is performed, in one exemplary embodiment, only when regular RTCP SR/RR packets are about to be sent. The proportion ($p_{up}$) by which the target rate is increased is set to its minimum (MIN_UP) every time when the target rate is adapted downwards. After that, $p_{up}$ is quadratically increased with a constant acceleration (STEP_INC, which is given per 1 s) every time the target rate is increased. Thus, the recovery speeds up when the persistent disturbance is over. The increasing speed upSlopeStep by which $p_{up}$ (or equally the static variable maxUpSlope) is increased is also upwards limited to a certain value (MAX_STEP, which is given per 1 s). Also $p_{up}$ is, in one exemplary embodiment, not allowed to increase above a certain upper bound (MAX_UP).

In these exemplary embodiments, the values for the parameters are selected such that the downwards change of the target rate value can be at most 50% of the adaptation range MBR-GBR when the current target rate is MBR. The upwards change cannot be more than 10% of the current rate in one exemplary embodiment. Also a certain settling time is used at the beginning of a session to allow the initial transients of adaptive references to pass away. In one exemplary embodiment the settling time was set to 1 s.

In one exemplary embodiment, the process for adjusting the target rate of the video signal is insensitive to the clock skewing. In this embodiment, the process was run with a $clk_{skew}$ value corresponding to a $clk_{skew}$ of 100,000,000 between video source and destination. The results of the process are (bit-exactly) equal to a $clk_{skew}$ value corresponding to a $clk_{skew}$ of 0. Further, the packet losses are taken into account so that the rate is adapted downwards with an extra amount of about 10% of the remaining bit rate range between the current target rate and GBR per loss packet, if packets have been lost during the time interval between two latest regular RTCP SR/RR packets.

Figure 5:
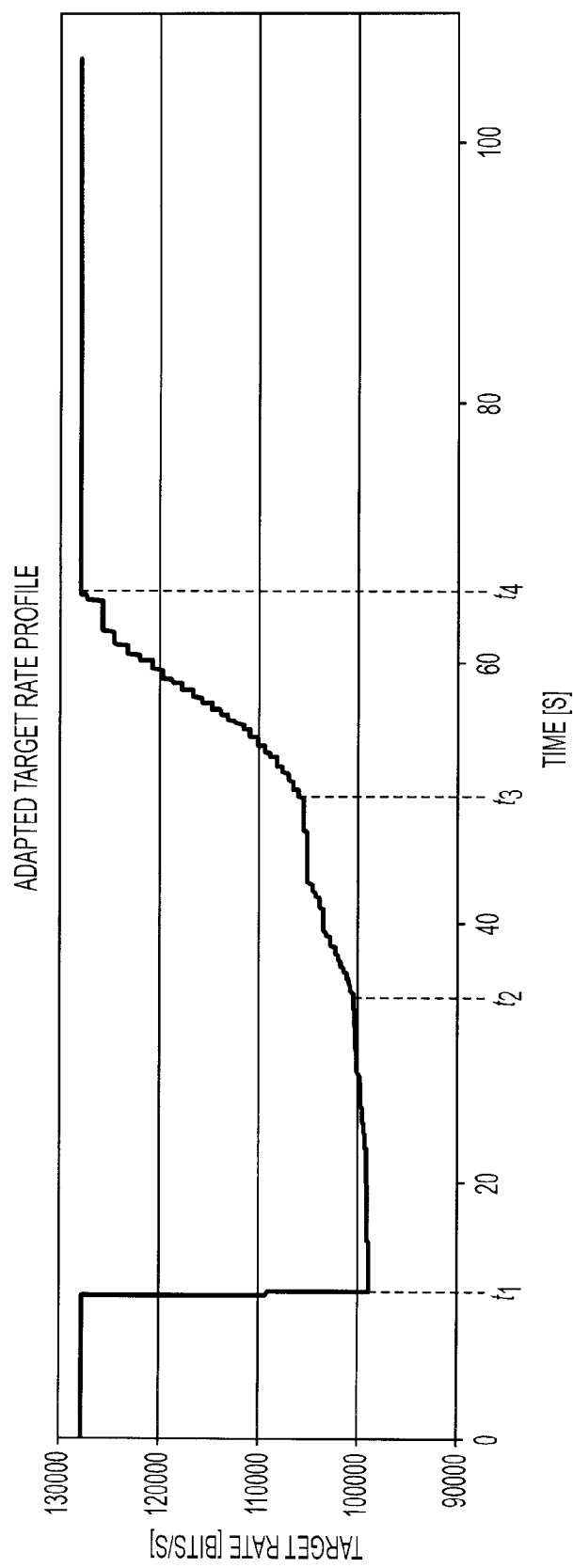
FIG. 5 is a graph showing a variation of the current target rate in time.

An illustrative specific example is discussed next. Although illustrative, this example is not intended to limit the exemplary embodiments or to suggest that other values, indicators and functions are not also possible. One goal of the video target rate adaptation is to reduce the target rate very steeply, when a congestion starts, in order to avoid or minimize the amount packet losses due to buffer overflows or timeouts and to prevent a high delay variation (i.e., jitter). The upwards recovery of the target rate is achieved at a slower speed than the downward adaptation in order to detect as early as possible if the congestion is still prevailing and return the target rate back down if necessary. This process is illustrated in FIG. 5, in which the target rate falls with a high speed at t1 to a low rate and recovers between t1 and t2 at a slower rate. The increase may be according to this embodiment based on a continuous and monotonic manner, because the congestion is over at time t3=50 s as shown in FIG. 5. Further, FIG. 5 shows that the recovery speeds up between t3 and t4 and starting with t4, the target rate is back to the original target rate, i.e., before the congestion occurred. Thus, according to one exemplary embodiment, the recovery of the target rate between t1 and t4 is adaptative, depending on the severity of the congestion. In other words, the process upwardly adjusts the target rate with a step that varies in time. In this exemplary embodiment, the step for upwardly adjusting the target rate is different for each of the time intervals t1-t2, t2-t3, and t3-t4. One or more steps may be used to upwardly adjust the target rate.

Figure 1:
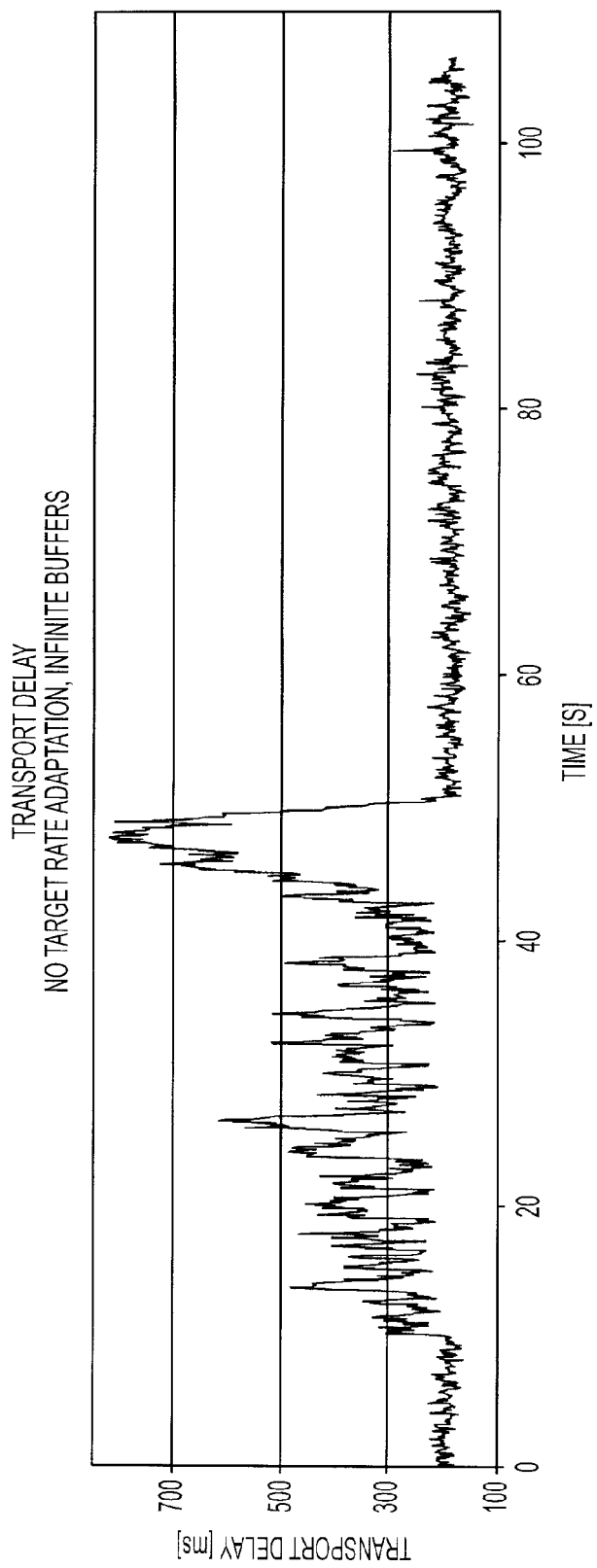
FIG. 1 is a graph showing a bursty congestion peak.

Next, the efficiency of the methods and devices based on the exemplary embodiments discussed above is compared to that of the traditional methods. In this regard, FIG. 6, similar to FIG. 1, shows the delay profiles without target rate adaptation, when packets that were pending more than a cut-off delay of 400 ms on the way (or in the buffers) are dropped. This cut-off delay causes packet losses (PLR=3.2%) during the congestion period. Both FIGS. 1 and 6 show that delay peaks are present for about 40 seconds, between 10 and 50 seconds and the transport delay is in the order of 300 to 700 ms for these cases.

Figure 6:
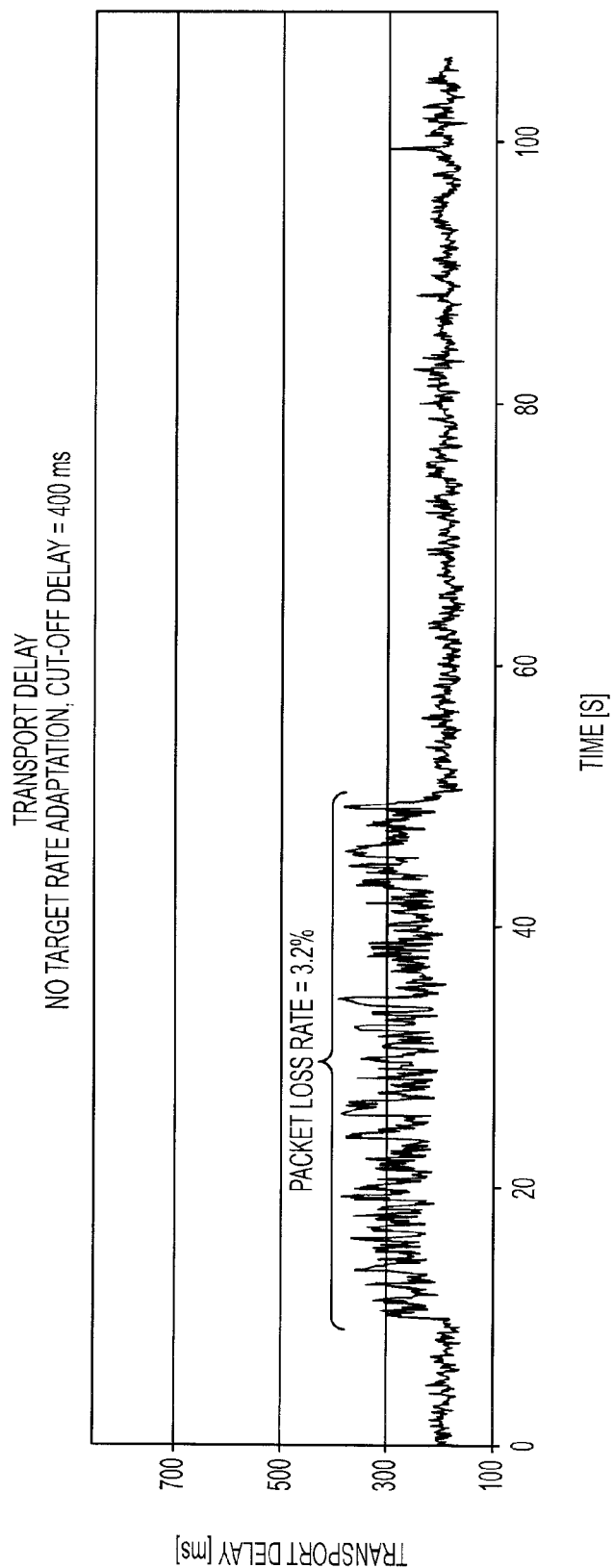
FIG. 6 is a graph showing a transport delay in a receiver with no rate adaptation.
Figure 7:
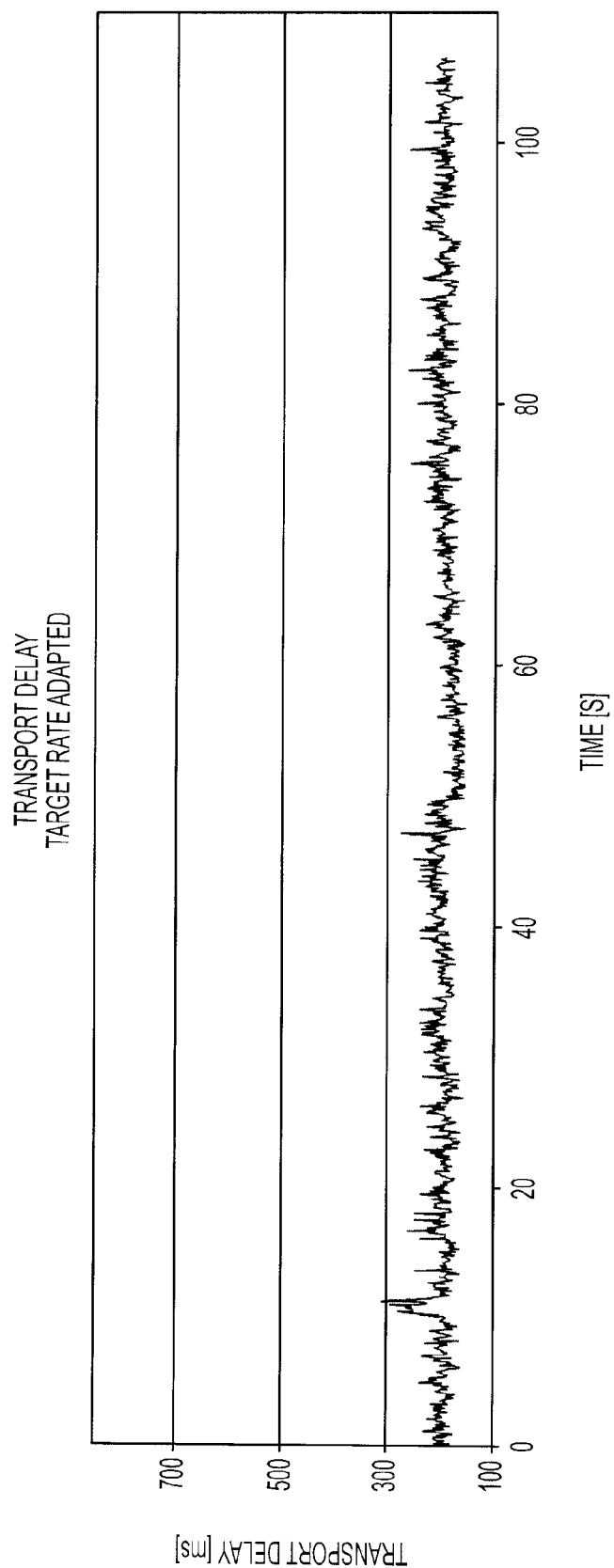
FIG. 7 is a graph showing a transport delay in a receiver with target rate adaptation.

FIG. 7 shows the video transport delays when the target rate adaptation, discussed in the above exemplary embodiments, is applied. The buffers are considered to be finite and also no packet losses are taking place. The novel rate adaptation process makes the transport delays smaller than for a system without the target rate adaptation illustrated in FIGS. 1 and 6. The transport delays are in the order of 150 to 300 ms for this scenario.

Figure 8:
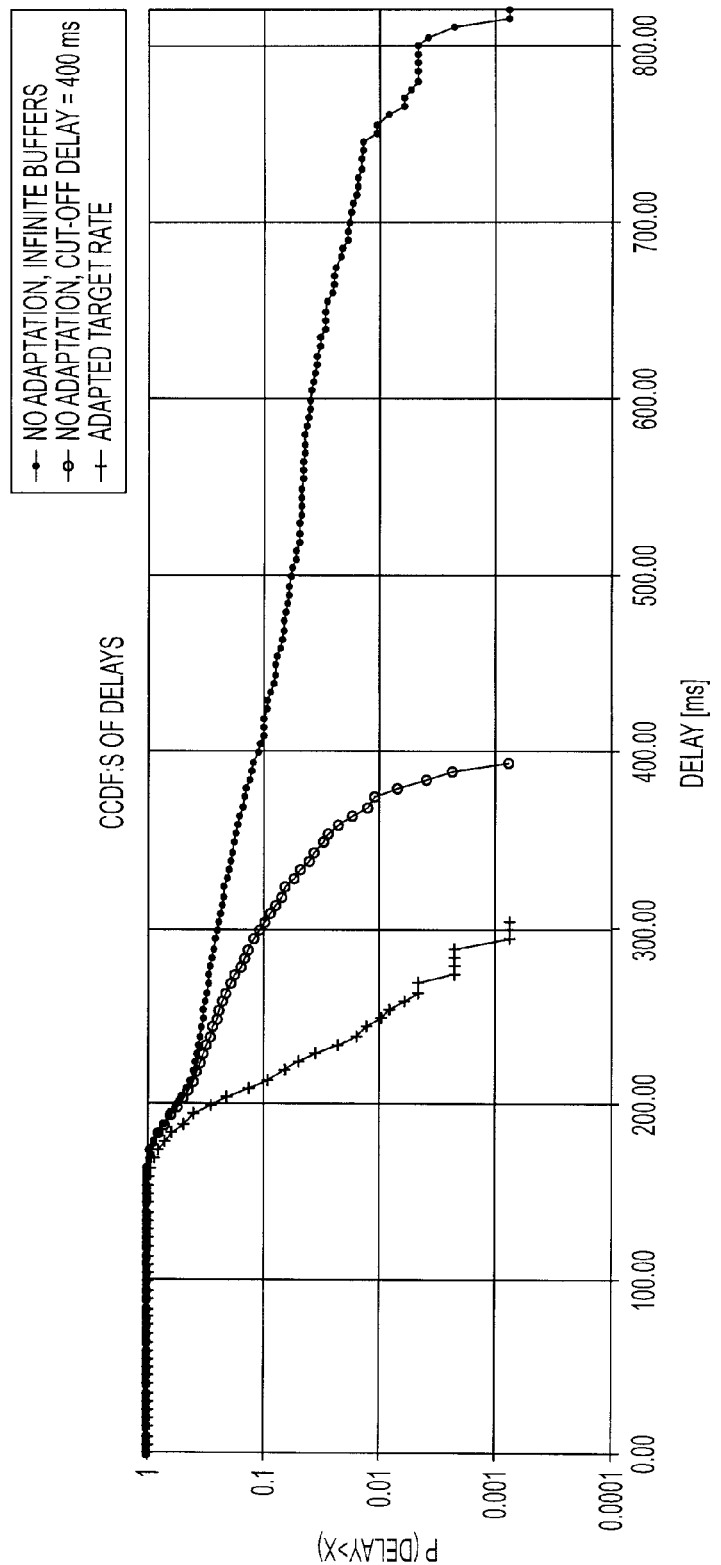
FIG. 8 is a graph showing a complementary cumulative distributions of the delays for three different systems.

FIG. 8 shows complementary cumulative distribution functions (CCDF) of the delays for the three scenarios shown in FIGS. 1, 6, and 7. The y-axis is a probability of an event that a delay is larger than the value on the x-axis. FIG. 8 shows that 99% quantile (i.e., crossing points of the curves with the horizontal line y=0.01) of the total e2e (end to end) transport delay is smallest with a rate adaptation of approximately 250 ms and largest without the rate adaptation with infinite buffers, approximately 750 ms. Thus, according to this exemplary embodiment with the rate adaptation, 99% of the packets are delayed less than 250 ms.

Figure 9:
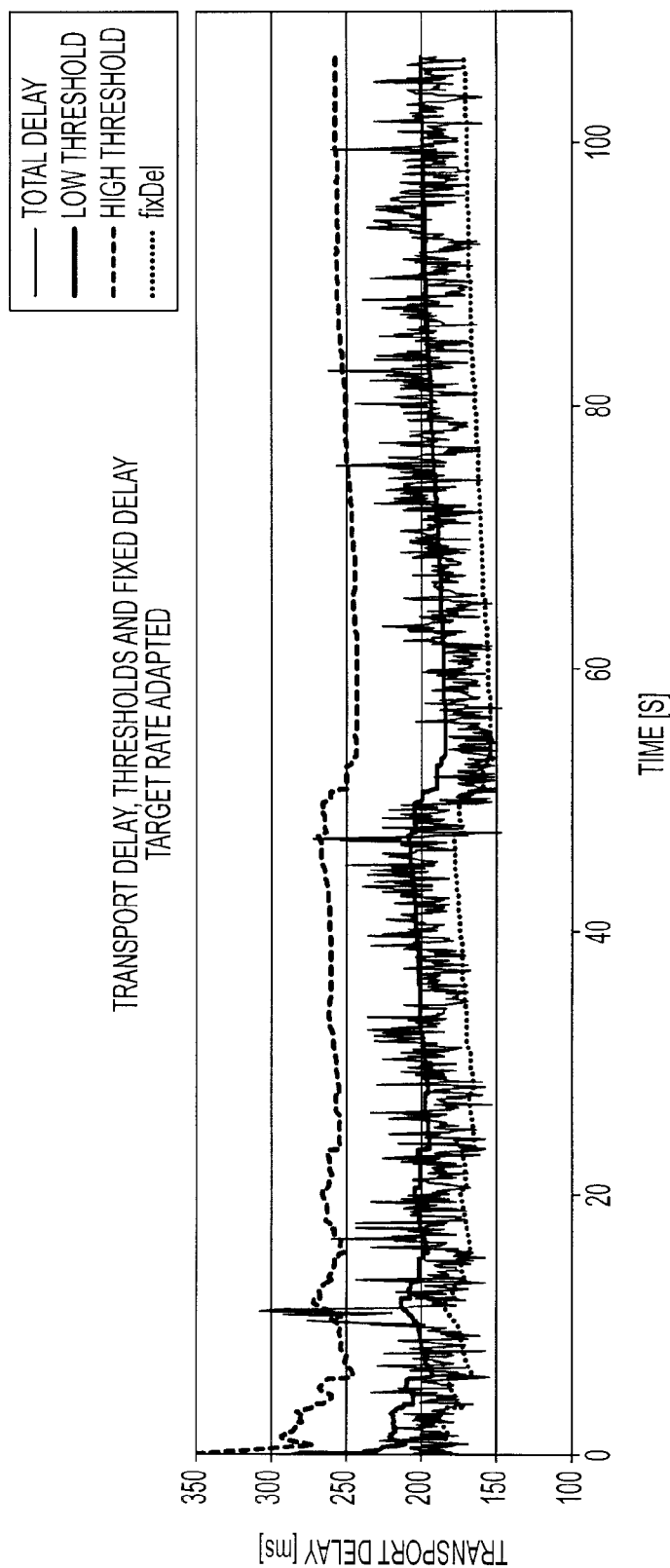
FIG. 9 is a graph showing a transport delay and corresponding high and low thresholds.

FIG. 9 shows the measured transport delays together with high and low thresholds for a method based on the exemplary embodiments. The two thresholds define a range in which the transport delay is desirable to be maintained. FIG. 9 also shows the fixed delay estimation. The system tries to maintain the e2e transport delay below the highThreshold line by reducing the target rate if needed, and determines the target rate to increase whenever the delay is with a high probability below the lowThreshold line until the target rate reaches MBR.

Figure 10:
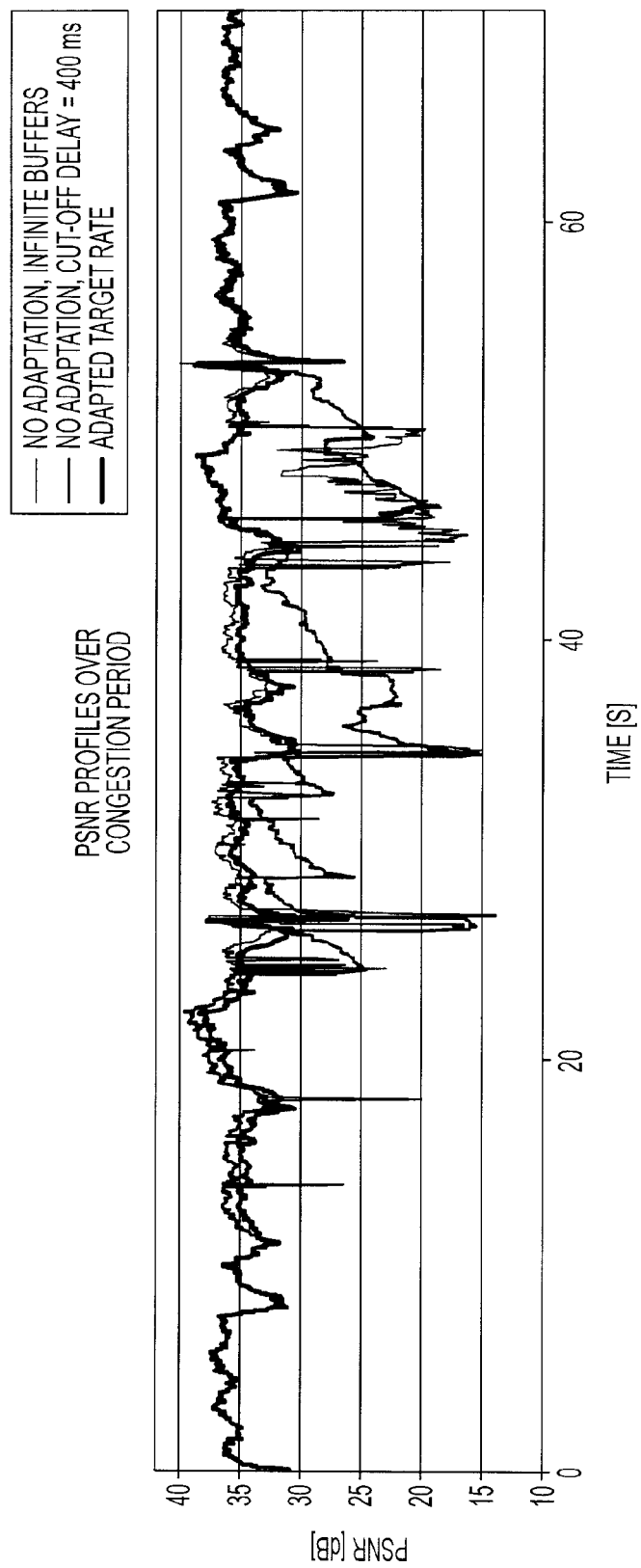
FIG. 10 is a graph showing a Peak Signal to Noise Ratio (PSNR) for the three different systems.
Figure 11:
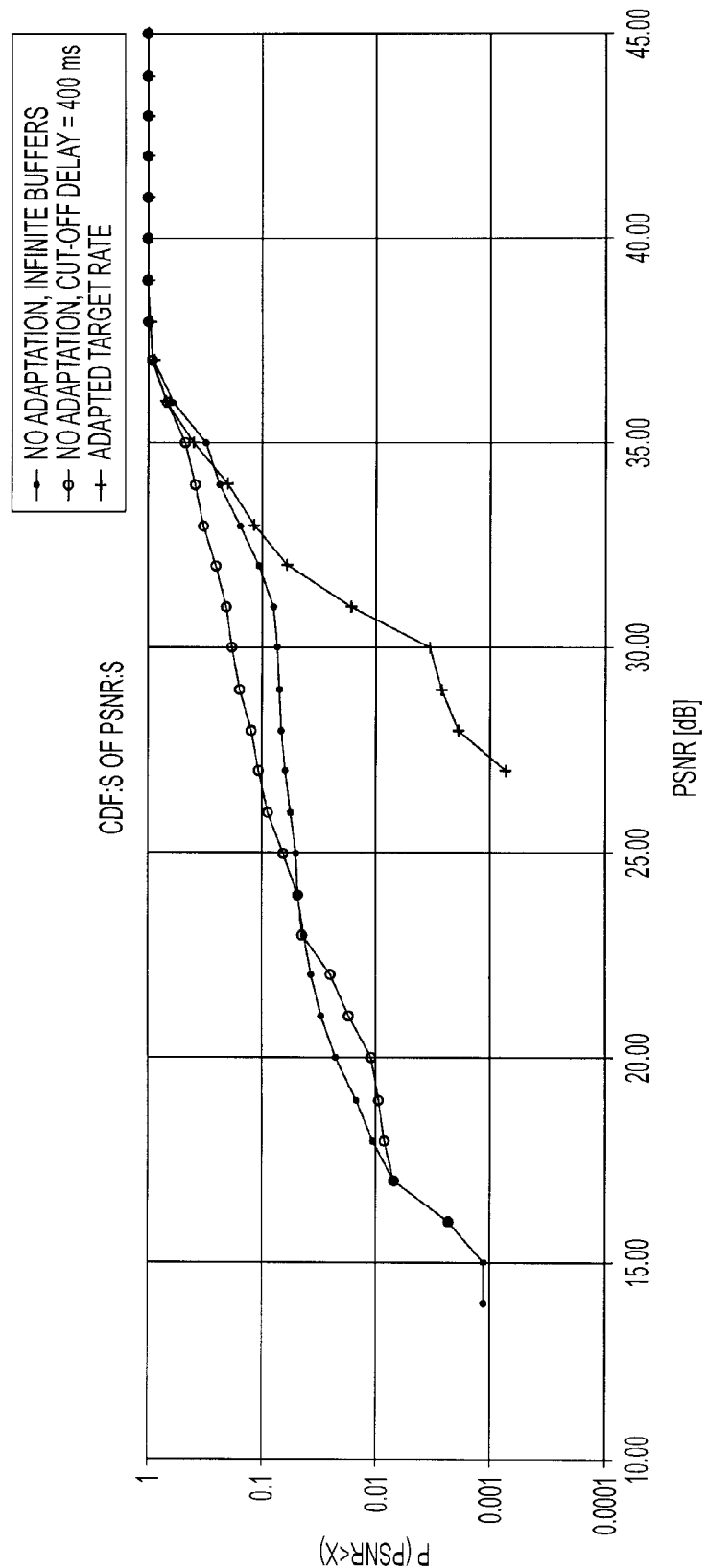
FIG. 11 is a graph showing the cumulative distribution functions (CDF) of the PSNRs for the three different systems.

FIG. 10 shows the Peak Signal to Noise Ratio (PSNR) over a time range 0 to 70 s. PSNR is an objective method understood by those skilled in the art to measure the perceptual quality of a video signal passing through a system by comparing the video signal to the same video signal that has not passed through the system. FIG. 11 shows the cumulative distribution functions (CDF) of the PSNRs for the three scenarios discussed above. The y-axis is a probability of an event that PSNR is smaller than the value on the x-axis. FIG. 10 shows that without the rate adaptation, the 99% quantile of PSNR is approximately 18 dB and with the target rate adaptation it is approximately 31 dB. The higher the PSNR the better the quality of the system. Thus, for the case with the rate adaptation, the PSNR of 99% of the frames is bigger than 31 dB. H.264 video codec was used in generating the data shown in FIGS. 10 and 11.

Figure 12:
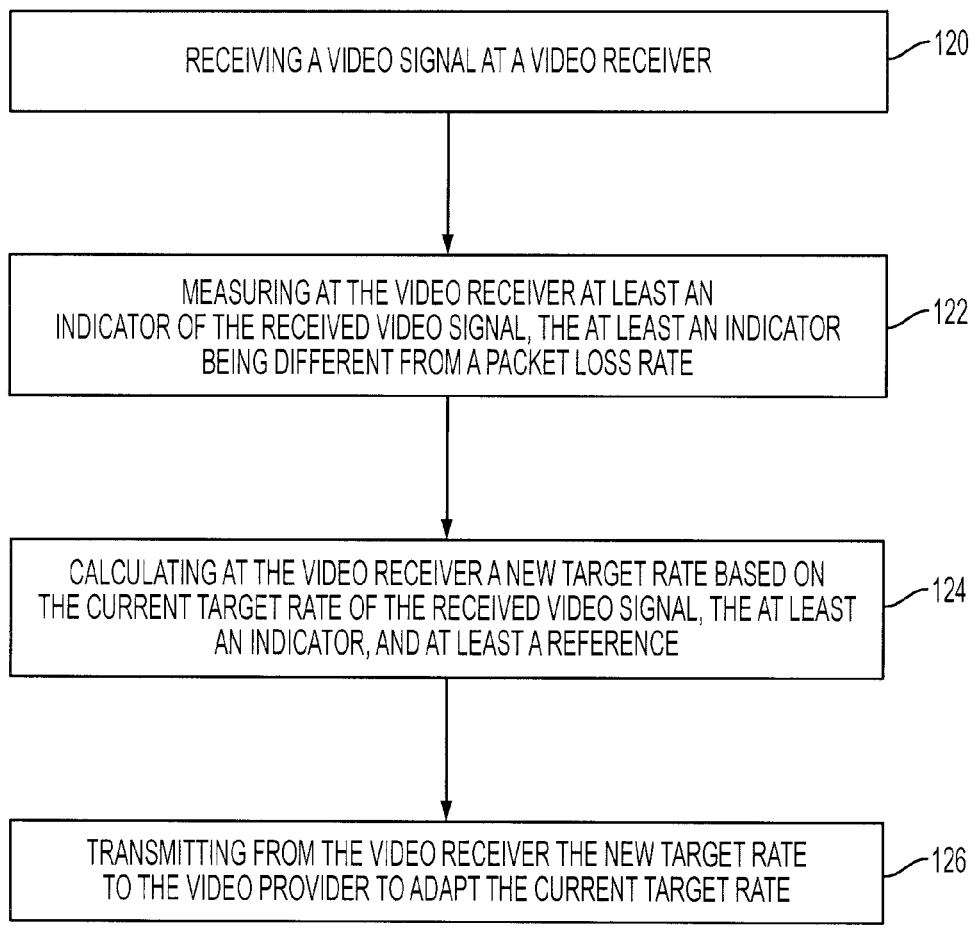
FIG. 12 is a flowchart illustrating a method for adapting a current target rate of a video signal transmitted from a video provider to a video receiver.

According to one exemplary embodiment, steps of a method for adapting a current target rate of a video signal transmitted from a video provider to a video receiver are shown in FIG. 12. The method includes a step 120 of receiving the video signal at the video receiver, a step 122 of measuring at the video receiver at least an indicator of the received video signal, a step 124 of calculating at the video receiver a new target rate based on the current target rate of the received video signal, the at least an indicator, and at least a reference, and a step 126 of transmitting from the video receiver the new target rate to the video provider to adapt the current target rate.

Figure 13:
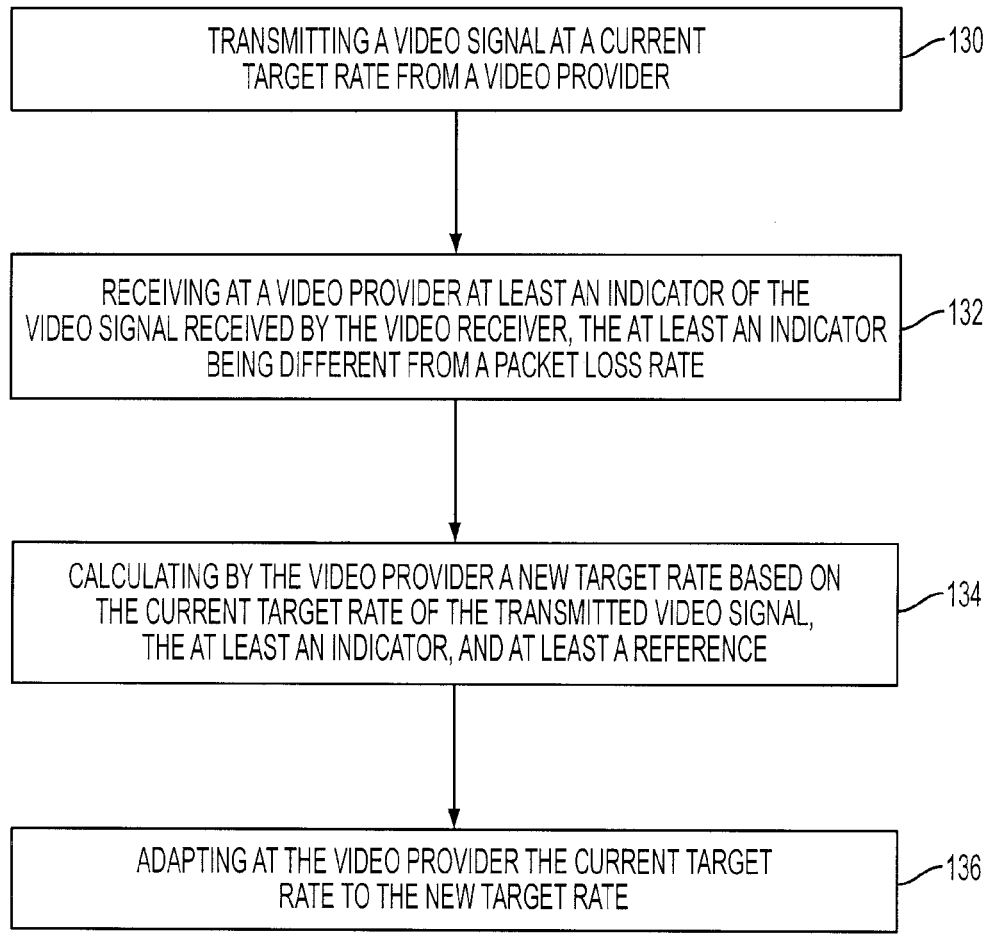
FIG. 13 is a flowchart illustrating another method for adapting a current target rate of a video signal transmitted from a video provider to a video receiver.

According to another exemplary embodiment, steps of a method for adapting a current target rate of a video signal transmitted from a video provider to a video receiver are shown in FIG. 13. The method includes a step 130 of transmitting the video signal at the current target rate from the video provider, a step 132 of receiving at the video provider at least an indicator of the video signal received by the video receiver, a step 134 of calculating by the video provider a new target rate based on the current target rate of the transmitted video signal, the at least an indicator, and at least a reference, and a step 136 of adapting at the video provider the current target rate to the new target rate.

Figure 14A:
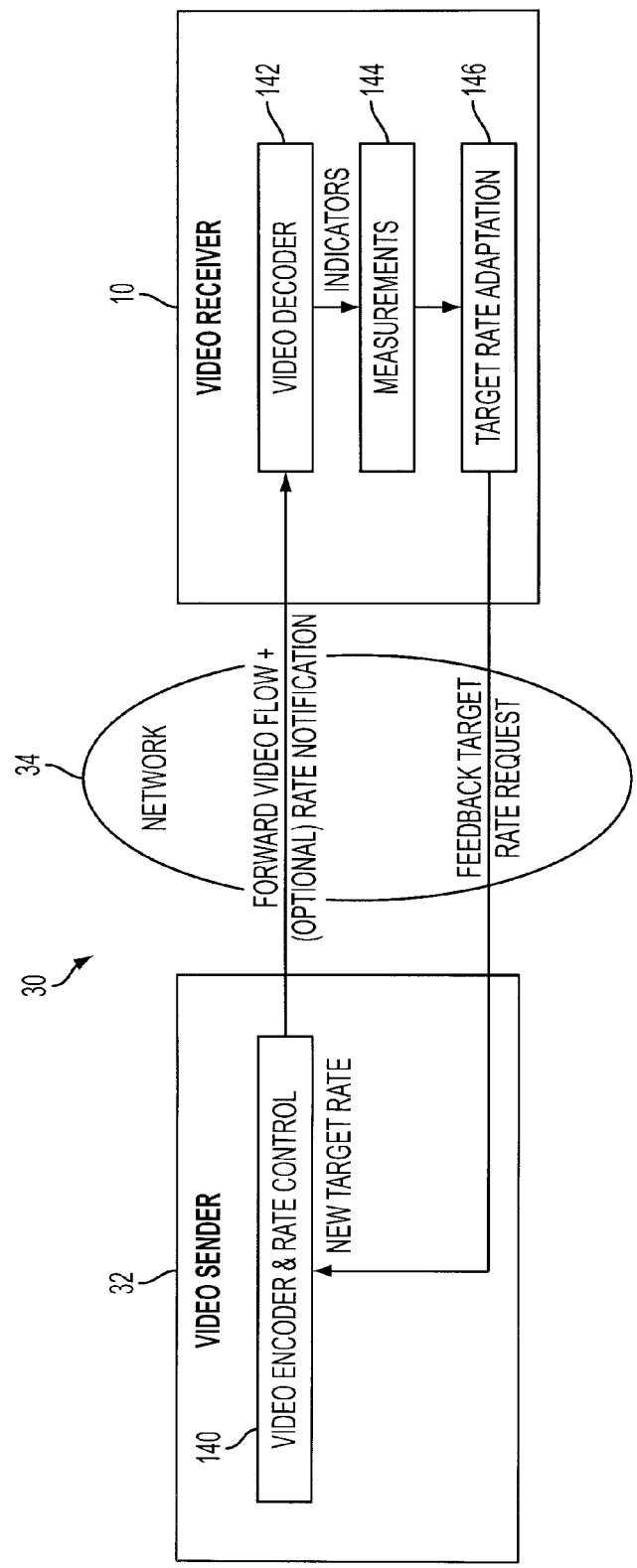
FIG. 14a is a schematic diagram of a video system according to an exemplary embodiment, in which a request based target rate adaptation is used.
Figure 14B:
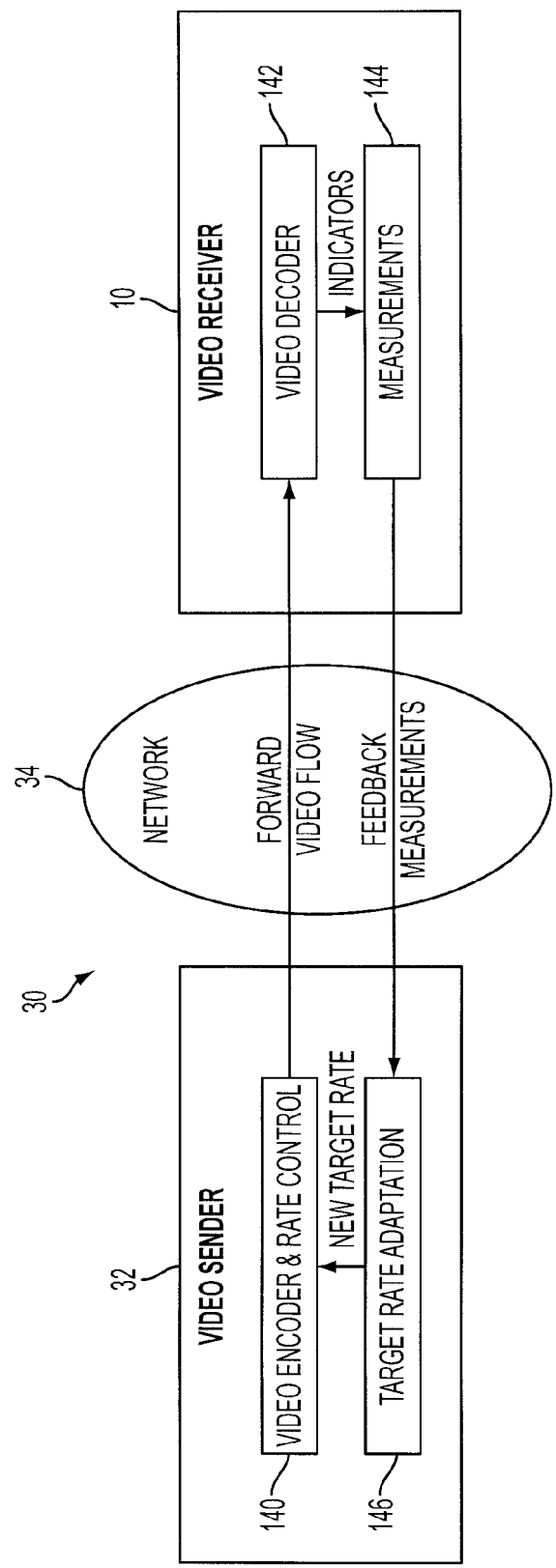
FIG. 14b is a schematic diagram of a video system according to an exemplary embodiment, in which a measurement based target rate adaptation is used.

The methods and processes discussed above may be implemented, according to an exemplary embodiment, in a system 30 as shown in FIG. 14*a*. The system may include the video sender 32 that sends via the network 34 video data to the video receiver 10. A video encoder and rate control unit 140 of the video sender 32 sends video data at a target rate to the video receiver 10. The video data is received by the video decoder unit 142 of the video receiver 10, which decodes the video data. A measurement unit 144 measures certain indicators and based on the measurements, a target rate adaptation unit 146 calculates the new target rate. The new target rate is feedback to the video sender 32 via the network 34 and the video encoder and rate control 140 of the video sender 32 adjusts its transmission rate based on the feedback from the video receiver 10. FIG. 14a shows only a one-way feedback but the above embodiments may be implemented such that both the video sender and the video receiver provide feedback to each other so that each device adapts its own transmission rate. FIG. 14b shows an exemplary embodiment in which the target rate adaptation is performed at the video sender 30, i.e., the target rate adaptation 146 is present at the video sender 30, which corresponds to the measurement based target rate adaptation.

Figure 15:
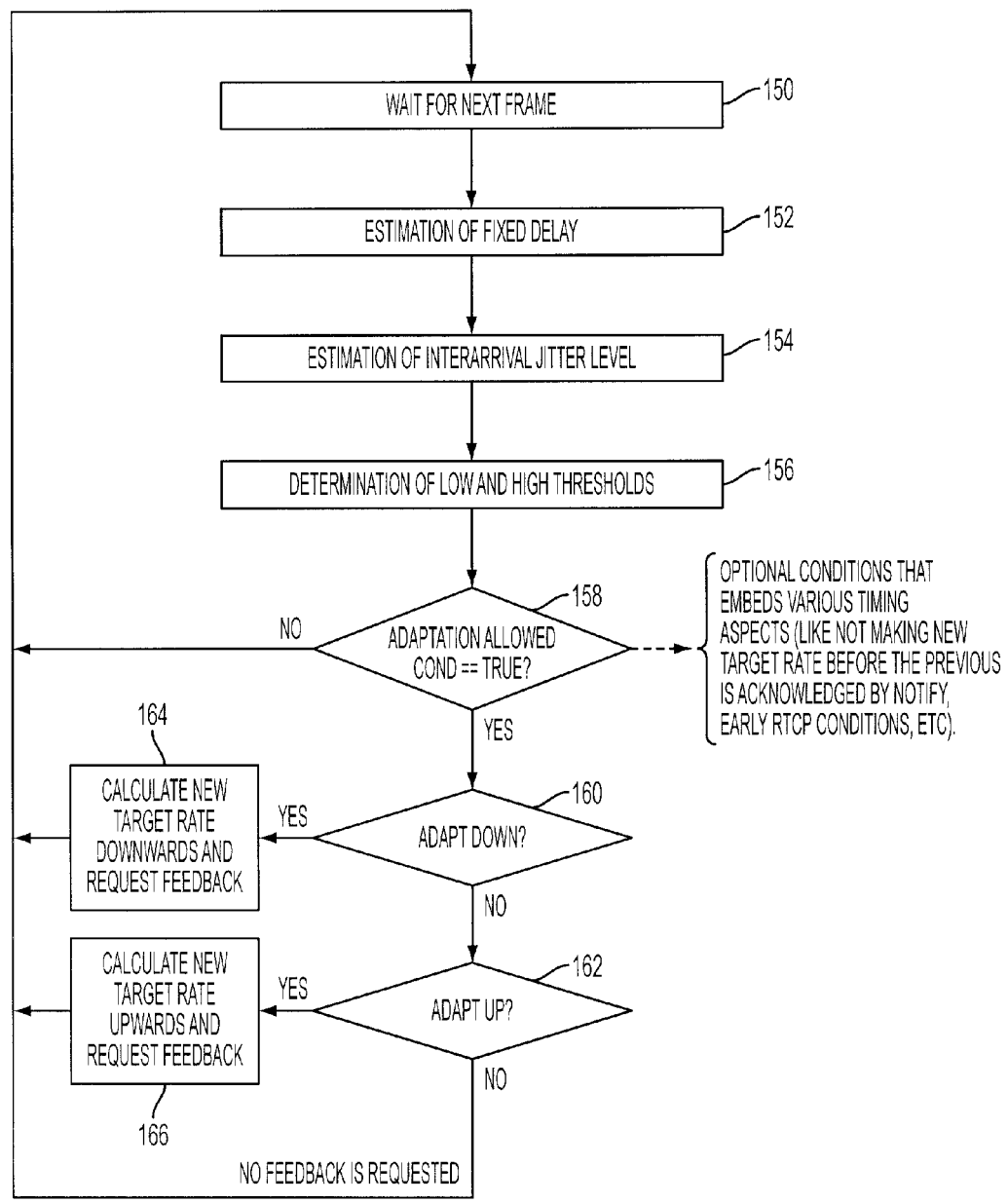

FIG. 15 is a block diagram indicating how the target rate is calculated in the system 30 shown in FIG. 14a. In step 150, the receiver waits for a next frame to arrive from the sender. In step 152, a fixed delay is estimated when the next frame has arrived. In step 154, an interarrival jitter level is estimated, as discussed above. In step 156, the low and high thresholds for the target rate are calculated. In step 158, the adaptation of the target rate is allowed if a predetermined condition is true. If the predetermined condition is true, the process advances to step 160, in which it is determined whether the adaptation is downwards. In step 158, if the predetermined condition is not true, the process returns to step 150. In step 160, if the adaptation of the target rate is not downwards, the process advances to step 162. If the adaptation is downwards, the process advances to step 164, where the new target is calculated downwards and feedback is provided to the sender. Then, the process advances to step 150. In step 162, the receiver determines if the adaptation of the target rate is upwards. If the adaptation is upwards, the process continues to step 166, where the new target rate is calculated upwards and feedback to the sender. Then, the process advances to step 150. If the adaptation is not upwards, the process returns to step 150 and no feedback is provided.

The disclosed exemplary embodiments provide a device, a system, a method and a computer program product for exchanging video signals with another device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a user terminal, a base station, and generally in a wireless communication network or system comprising both the user terminal and the base station. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a controller for use in the video provider, the video receiver or any host computer. The video receiver may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

What is claimed is:

1. A method for adapting a current target rate of a video signal transmitted from a video provider to a video receiver, comprising:
    receiving the video signal at the video receiver;
    measuring at the video receiver at least an indicator of the received video signal, the at least an indicator being different from a packet loss rate;
    calculating at the video receiver a new target rate based on the current target rate of the received video signal, the at least an indicator, and at least a reference being at least one of a low pass filtered delay, an asymmetrically weighted low pass filtered delay and delay thresholds based on addition of low pass filtered delay scaled estimates of the power of a high pass filtered delay; and
    transmitting from the video receiver the new target rate to the video provider to adapt the current target rate.

2. The method of claim 1, further comprising:
    adjusting upwardly the current target rate with a step that varies in time.

3. The method of claim 1, further comprising:
    correcting the new target rate to be within a predetermined range if the calculated new target range is larger than a first predetermined threshold or smaller than a second predetermined threshold.

4. The method of claim 1, further comprising:
    calculating the new target rate only if a predetermined condition is triggered.

5. The method of claim 4, wherein the predetermined condition comprises at least one of:
    a first condition that indicates whether the current target rate is smaller than a predetermined low target rate;
    a second condition that indicates whether the current target rate is larger than a predetermined high target rate; and
    a third condition that prevents a calculation of the new target rate if a time interval between a previous calculation of the new target rate and a current calculation of the new target rate is less than a predetermined time interval.

6. The method of claim 1, wherein the at least a reference is a vectorial quantity that includes a plurality of reference components.

7. The method of claim 1, wherein the at least an indicator is a vectorial quantity that includes a plurality of indicator components.

8. The method of claim 1, wherein the calculating further comprises:
adjusting downwardly the current target rate with a larger step than adjusting upwardly the current target rate.

9. The method of claim 1, wherein the at least an indicator is at least one of a transport delay of a frame of the video signal, a buffering delay, a received bit-rate, and a received packet rate.

10. The method of claim 1, further comprising:
measuring at the video receiver the packet loss rate of the received video signal; and
the step of calculating including calculating the new target rate based on the current target rate, the at least one indicator, the packet loss rate, and the at least a reference.

11. A device for calculating a new target rate of a video signal transmitted from a video provider, comprising:
at least an input/output port configured to receive the video signal;
a processor connected to the at least an input/output port and configured to determine at least an indicator from the received video signal, wherein the at least an indicator is different from a packet loss rate, calculate a new target rate based on the current target rate of the received video signal, the at least an indicator, and at least a reference being at least one of a low pass filtered delay, an asymmetrically weighted low pass filtered delay, and delay thresholds based on addition of low pass filtered delay scaled estimates of the power of a high pass filtered delay; and the input/output port is further configured to transmit the new target rate to the video provider such that the video provider adapts the current rate to the new target rate.

12. The device of claim 11, wherein the processor is further configured to adjust upwardly the current target rate with a step that varies in time.

13. The device of claim 11, wherein the processor is further configured to adjust downwardly the current target rate with a larger step than adjusting upwardly the current target rate.

14. The device of claim 1, wherein the at least an indicator is at least one of a transport delay of a frame of the video signal, a buffering delay, a received bit-rate, and a received packet rate.

15. The device of claim 1, wherein the processor is further configured to measure the packet loss rate at the received video signal, and to calculate the new target rate based on the current target rate, the at least one indicator, the packet loss rate, and the at least a reference.

16. The device of claim 1, wherein the device is a video receiver including one of a phone, computer, personal digital assistant, a TV set, a set-top box, and a camera.

17. A non-transitory computer readable medium storing computer executable instructions, wherein the instructions, when executed by a processor, cause a video receiver including the processor to calculate a new target rate of a video signal, said instructions comprising instructions to:
receive the video signal at the video receiver;
measure at the video receiver at least an indicator of the received video signal, the at least an indicator being different from a packet loss rate;
calculate at the video receiver a new target rate based on the current target rate of the received video signal, the at least an indicator, and at least a reference being at least one of a low pass filtered delay, an asymmetrically weighted low pass filtered delay, and delay thresholds based on addition of low pass filtered delay scaled estimates of the power of a high pass filtered delay; and
transmit from the video receiver the new target rate to a video provider to adapt the current target rate.

* * * * *

UNITED STATES PATENT AND TRADEMARK OFFICE
CERTIFICATE OF CORRECTION

PATENT NO. : 8,588,071 B2  
APPLICATION NO. : 12/921428  
DATED : November 19, 2013  
INVENTOR(S) : Mahkonen Page 1 of 1

It is certified that error appears in the above-identified patent and that said Letters Patent is hereby corrected as shown below:

In The Claims

In Column 18, Line 10, in Claim 14, delete "claim 1," and insert -- claim 11, --, therefor.

In Column 18, Line 13, in Claim 15, delete "claim 1," and insert -- claim 11, --, therefor.

In Column 18, Line 18, in Claim 16, delete "claim 1," and insert -- claim 11, --, therefor.

Signed and Sealed this  
Nineteenth Day of April, 2016

Michelle K. Lee  
*Director of the United States Patent and Trademark Office*